(12) United States Patent
Johansen et al.

(10) Patent No.: US 9,562,451 B2
(45) Date of Patent: Feb. 7, 2017

(54) METHOD AND SYSTEM FOR THE REMOVAL OF PARTICULATE MATTER SOOT, ASH AND HEAVY METALS FROM ENGINE EXHAUST GAS

(71) Applicants: Haldor Topsøe A/S, Kgs. Lyngby (DK); Ecospray Technologies S.r.l., Alzano Scrivia (IT)

(72) Inventors: Keld Johansen, Frederikssund (DK); Maurizio Archetti, Verscio (CH)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 14/780,490

(22) PCT Filed: Apr. 30, 2013

(86) PCT No.: PCT/EP2013/059028
§ 371 (c)(1),
(2) Date: Sep. 25, 2015

(87) PCT Pub. No.: WO2014/169967
PCT Pub. Date: Oct. 23, 2014

(65) Prior Publication Data
US 2016/0053644 A1    Feb. 25, 2016

(30) Foreign Application Priority Data

Apr. 15, 2013 (DK) .................... 2013 00224

(51) Int. Cl.
*F01N 3/00* (2006.01)
*F01N 3/023* (2006.01)
*F01N 3/10* (2006.01)
*F01N 3/20* (2006.01)
*F01N 3/035* (2006.01)
*F01N 13/00* (2010.01)

(52) U.S. Cl.
CPC ............ *F01N 3/0233* (2013.01); *F01N 3/0232* (2013.01); *F01N 3/035* (2013.01); *F01N 3/106* (2013.01); *F01N 3/2066* (2013.01); *F01N 13/009* (2014.06); *F01N 13/0093* (2014.06); *F01N 2340/06* (2013.01); *F01N 2590/02* (2013.01); *Y02T 10/24* (2013.01)

(58) Field of Classification Search
USPC ................. 60/274, 286, 287, 289, 292, 293, 295,60/296, 301, 311, 323
See application file for complete search history.

(56) References Cited

U.S. PATENT DOCUMENTS 5,065,574 A * 11/1991 Bailey .................. F01N 3/0233
55/283
5,390,492 A *  2/1995 Levendis ................ F01N 3/023
55/302

(Continued)

FOREIGN PATENT DOCUMENTS

| JP | 7-286511 A | 10/1995 |
|---|---|---|
| WO | WO 99/10633 A1 | 3/1999 |
| WO | WO 2012/041455 A1 | 4/2012 |

*Primary Examiner* — Binh Q Tran
(74) *Attorney, Agent, or Firm* — Blank Rome LLP

(57) ABSTRACT

Method and system for removal of soot, ash and heavy metals, and optionally additionally $NO_x$ and $SO_x$ being present in exhaust gas from an engine operated on heavy fuel oil with sulphur content 0.1%-4.0 wt % and a heavy metal element content of 5 mg/kg to 1000 mg/kg.

22 Claims, 2 Drawing Sheets

(56) References Cited

U.S. PATENT DOCUMENTS

Figure 1:
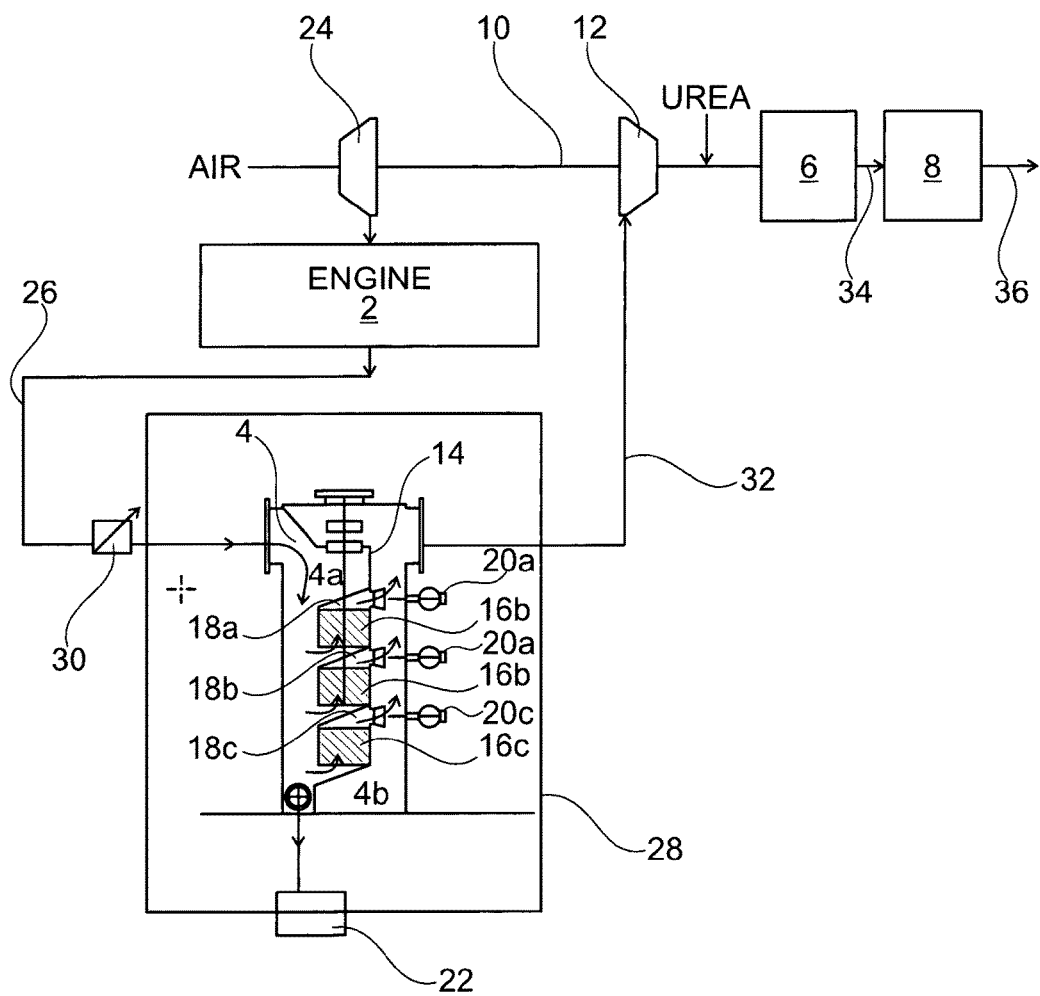

| | | | |
|---|---|---|---|
| 6,823,665 B2 * | 11/2004 | Hirota | B01D 53/9495 60/285 |
| 7,273,514 B2 * | 9/2007 | Bailey | B01D 46/0058 422/168 |
| 7,743,606 B2 * | 6/2010 | Havlena | F01N 3/035 60/274 |
| 7,954,313 B2 * | 6/2011 | Hirata | B01D 53/944 60/286 |
| 2010/0224062 A1 | 9/2010 | Patterson et al. | |

* cited by examiner

METHOD AND SYSTEM FOR THE REMOVAL OF PARTICULATE MATTER SOOT, ASH AND HEAVY METALS FROM ENGINE EXHAUST GAS

The present invention relates to a method and system for the removal of hydrocarbons and particulate matter in form of soot, ash and heavy metals being present in exhaust gas from an engine. In particular the invention is useful for the removal of these components from the exhaust of an engine operated on heavy fuel oil with a sulphur content of 0.1% to 4.0 wt % and a heavy metal content of 5 mg/kg to 1000 mg/kg.

Soot and ash are typically captured and removed by passing the exhaust through one or more filters arranged in the exhaust system. After a certain time on stream the captured amounts of soot and ash cause an increasing pressure drop over the filters and the filters need to be regenerated by burning off the soot and blowing off the ash with compressed air or by a manual process.

The known particulate filter systems are developed for diesel engine exhaust with a relatively low sulphur and ash content. These systems can not be employed for e.g. maritime engines fuelled with heavy fuel oil, the so called bunker oil.

Bunker oil contains very heavy hydrocarbons and polyaromatic compounds. The oil is heavily contaminated with compounds, which do not burn and end as ash in the exhaust. Further contaminants contained in bunker oil include not only water soluble metal salts sodium (Na), potassium (K), calcium (Ca), iron (Fe), sulfates ($MeSO_4$), and several others, but also the oil soluble metals vanadium (V), lead (Pb), nickel (Ni) and others.

Thus, the general object of the invention is to provide a method and system for cleaning exhaust gas resulting from engines being fuelled with heavy fuel oil, which method and system ensures an effectively cleaning and a continuous operation of the engine, even when a particulate filter employed in the method and system needs to be regenerated.

Essential features of the invention are a continuous passive regeneration of particulate filters by catalysing the filters with soot combustion and hydrocarbon oxidation catalysts, thereby improving the fuel consumption by keeping the pressure drop over the particulate filters low and by periodically and effectively blowing off of ash by pulse injection of air into outlet of the filters. The catalysts removes sticky hydrocarbon containing soot that facilitates the ash removal.

As discussed above soot in the exhaust gas from the engine contains further inorganic ash that cannot combust and therefore will accumulate in the filter over time and build up the pressure drop. Consequently, ash must be removed by periodical reversing the flow direction of the exhaust gas through the filter or blowing off the ash by impulsed injection of air.

In summary, the invention provides a method for removal of soot, hydrocarbons, ash and heavy metals being present in exhaust gas from an engine operated on heavy fuel oil with a sulphur content 0.1% to 4.0 wt % and a heavy metal element content of 5 mg/kg to 1000 mg/kg, comprising the steps of operating the engine at a load to obtain an exhaust temperature of the exhaust gas of at least 325° C.;

passing the exhaust gas at exhaust gas temperature 325° C. to 550° C. through the at least one filter unit each comprising at least one particulate filter and capturing the soot, ash and heavy metals contained in the exhaust gas;

continuously burning the captured soot and adhered hydro-carbons off the at least one particulate filter by contact with a catalyst being arranged on the filter;

periodically disconnecting the at least one filter unit from flow of the exhaust gas unit and closing outlet of the at least one particulate filter;

subsequently pulse injecting air into the closed outlet of the at least one particulate filter in reverse to the previous flow of the exhaust gas and blowing the captured ash and remaining amounts of soot together with the heavy metals off the at least one particulate filter.

The particulate filters for use in the invention are preferably made from silicon carbide, cordierite, mullite, aluminium titanate or sintered metal.

Typically, the filters are shaped as wall flow filters, which ensure the highest cleaning efficiency, but other filter types may be employed.

The soot combustion catalyst is coated on or inside the filter walls.

Catalysts being active in the combustion of soot are known in the art and described inter alia in the patent literature.

A preferred catalyst comprises titanium dioxide, oxides of vanadium and tungsten and metallic palladium as further disclosed in European patent no. EP1493484 B1.

The catalyst reduces the ignition temperature of the trapped soot down to 350° C. and at optimal process conditions further down to 325° C.

An auxiliary engine can be operated at a part load, whereby the exhaust gas temperature is above 325° C. The exhaust gas temperature above 325° C. at filter inlet thus secures passive regeneration by continuous soot combustion.

Heavy fuel oil contains large amounts of vanadium and iron acting as fuel born additives and facilitate additionally burning off the soot above 325° C. and thereby make it unnecessary to add additives to the fuel.

As mentioned above an essential feature of invention is removal of trapped ash formed during combustion of the heavy fuel oil. The particulate filters must be cleaned periodically by shutting off the filters from exhaust gas flow.

The blown off ash may by removed from the filter units by a proper auxiliary ash discharge valve or by a proper ash conveying method known in the art.

All the filter units can be cleaned by the above method according to the invention in a cyclic cleaning loop. The engine can remain in continuous operation because at least one filter unit remains in filtration mode.

During cleaning of the particulate filters, air is injected in reverse to the previous flow of the exhaust gas at an injection pulse duration of between 10 and 600 msec, preferably 300 msec.

In the cleaning cycle the actual particulate filter is closed at its outlet and the air is injected into the closed outlet by a valve or nozzle e.g mounted on or near the closing valve. Thereby the blowing off the ash trapped in the filter is even more efficiently because of the lower volume the air pulse is injected into compared to a manner, where the filter outlet is open. In the latter case, the air pulse propagates throughout the whole filter unit encasing the particulate filter/s and thus limit the ash cleaning effect.

In further an embodiment of the invention, the air for pulse injection is withdrawn from an accumulator tank with compressed air at a pressure 4 to 10 barg, preferably 6.5 barg.

In still an embodiment, the unit/s are arranged in a pressure vessel upstream an engine turbocharger. The exhaust gas may then be passed through the filter unit/s at a pressure of between 0 and 3 barg.

The soot combustion temperature can in this embodiment be kept at a more optimal level about 400° C. without additional exhaust gas heating. As a further advantage, the pressure drop over the particulate filter(s) is decreased when increasing the pressure of the exhaust gas and the temperature. This results in a diminished filter volume required for effective filtration and facilitates e.g. retrofit installation on ships with limited space for exhaust gas treatment.

The filtration process is in still an embodiment additionally combined with selective catalytic reduction (SCR) of nitrogen oxides (NOX) in the exhaust gas prior to the gas is passed through the filter unit/S or after the gas has passed through the filter unit(s).

As the engine is operated above a minimum load resulting in an exhaust gas temperature of at least 325° C. the thermal mass of the SCR unit has a negligible effect on the passive regeneration of the downstream filter unit(s).

An important feature of the invention as disclosed above is the possibility to remove sulphur oxides being formed when burning heavy fuel oil in the engine. The upstream soot burning catalyst is resistant to sulphur compounds and has a limited $SO_2$ to $SO_3$ oxidation potential.

Thus, in a further embodiment the method comprises the additional step of reducing amounts of sulphur oxides contained in the exhaust gas by scrubbing the gas with an alkaline solution or sea water in an open or closed loop, downstream of the at least one filter unit. The scrubber's alkaline counter current circulating solution employed in this method step converts the sulphur oxides to harmless alkaline metal sulphates or sulphites. The sulphur oxides are thereby almost completely removed and the clear low turbidity spent solution is either discharged to the sea or accumulated for delivery on-shore.

As a further advantage, seawater can be used to mix with scrubber liquid. As heavy metals and soot are removed by the filters, the captured sulphur oxide content in the scrubber liquid can then be appropriately diluted for pH control and discharged to the sea.

The invention provides furthermore a System for removal of soot and ash being present in exhaust gas from an engine operated on heavy fuel oil comprising one or more exhaust gas inlet pipes connecting each the engine with inlet of each of one or more filtration units;

one or more exhaust gas outlet pipes connected to outlet of each of the one or more filtration units;

at least one particulate filter catalyzed with a catalyst for effectuating burning off of soot with adhered hydrocarbons connected in parallel within the one or more filtration units, outlet of each of the at least one particulate filter is lockable; and and an air pulse jet valve arrangement mounted at the outlet of the at least one particulate filter for blowing off ash from the at least one particulate filter, the air pulse jet valve arrangement comprises an isolation valve, one or more air blow pipes connected to an air supply, nozzles in the blow pipes and an eductor for pulse injection of air through the nozzles in the blow pipes into the at least one particulate filter.

The reverse flow through the filter is controlled by automatic managing the jet valves at filter outlet as described below by reference to the drawings in which FIG. 1 schematically shows operation of the system according to an embodiment of the invention.

Preferred embodiments are disclosed in the following. These embodiments can either be employed individually or in combination.

The at least one particulate filter is in form of a wall flow filter.

The at least one particulate filter is coated on walls or inside walls with a catalyst catalysing burning of captured soot with adhered hydrocarbons of the filters.

The catalyst consists of titanium dioxide, oxides of vanadium and tungsten and metallic palladium.

Body of the at least one particulate filter is prepared from silicon carbide, cordierite, mullite, aluminium titanate or sintered metal.

The one or more air blow pipes are connected to an accumulator tank with compressed air.

The one or more filtration units are arranged in a pressure vessel upstream an engine turbocharger.

The one or more filtration units are arranged downstream an engine turbocharger.

The one or more exhaust gas outlet pipes connect the one or more filtration units to a downstream selective catalytic reduction unit comprising a denitrification (SCR) catalyst.

The one or more exhaust gas inlet pipes connect the one or more filtration units to an upstream selective catalytic reduction unit comprising a denitrification (SCR) catalyst.

The one or more exhaust gas outlet pipes connect the one or more filtration units to a scrubber unit.

A selective catalytic reduction unit comprising a denitrification (SCR) catalyst unit is connected upstream to the one or more filtration units and downstream to a scrubbing unit.

The selective catalytic reduction unit is arranged upstream an engine turbocharger.

The system comprises further a by-pass pipe by-passing the exhaust gas at least one of the one or more filtration units.

The various advantages of the different embodiments of the system according to the invention are already discussed above in connection with the disclosure of the method according to the invention.

A more detailed description of the method and system will be apparent from the following description of a specific embodiment with reference to the drawings in which FIG. 1 shows a schematic flow sheet of the method and system according to the invention; and FIG. 2 is en exploded view of the cleaning arrangement and the valve and nozzle configuration arranged at outlet of a particulate filter.

Referring now to FIG. 1, the system for use in the method according to an embodiment of the invention comprises a filtration unit 4 connected at outlet via exhaust turbine 12 of a turbocharger 10 to an SCR unit 6. SCR unit 6 is connected to an $SO_x$-scrubber 8.

A filtration unit 4 is divided by a wall 14 into an exhaust gas inlet section 4a and a filtrated exhaust gas outlet section 4b. Unit 4 contains three particulate filters 16a,b,c.

The particulate filters are modular and spaced apart arranged in unit 4, which allows individual regeneration or replacing of spent filters as described below.

Outlets 18a, b, c of the particulate filters are lockable connected to pulse jet cleaning valves 20a, b, c. The cleaning valves can lock the outlet of the filters sequentially or all at once after a predetermined time on stream or otherwise determined, e.g. by the pressure drop created over the filters. The jet cleaning valves may be connected to an accumulator tank with compressed air (not shown) and provide a pressurized and pulsed air stream with a duration as disclosed above in reverse flow to the previous exhaust gas flow through filters 16a,b,c. By these means, ash and remaining amount of soot together with heavy metals accumulated in the filters are blown off to a soot and ash discharge sluice 22. During regeneration of filters 4a, b, c, exhaust gas flow to the actual filtration units, unit 4 in FIG. 1 is disrupted by means of valve 30 and the gas is by-passed to another filtration unit (not shown).

The filtration unit 4 is connected to a downstream air compressor 24 of turbocharger 10 via engine 2 by exhaust gas pipe 26. The advantage of such a configuration is described hereinbefore.

When connected upstream of turbocharger air compressor it is preferred to arrange filtration unit 4 within a pressure vessel 28 in order to filtration unit can better utilize the pressure drop gain with the same soot load obtained by the pressurized engine exhaust gas and soot combustion increases with higher temperature that always is present upstream turbocharger may eliminate support heating.

The filtrated exhaust gas is passed from filtration unit 4 in line 32 via exhaust turbine 12 of turbocharger 10 to SCR catalyst unit 6. Prior to be introduced into unit 6, urea is injected into the gas as reductant for the catalytic SCR of nitrogen oxides. The SCR reaction and catalysts for use in the reaction are widely disclosed and known in the art and need no further description.

Finally, the SCR treated exhaust gas in pipe 34 is passed to scrubber unit 8 for the removal of $SO_x$. In unit 8 the exhaust gas is scrubbed with a diluted alkaline solution, e.g. an aqueous solution of sodium hydroxide wherein the $SO_x$ are converted to sodium sulphite and/or sodium sulphate dissolved in the scrubber solution. The pH value of spent scrubber solution can easily be adjusted to a value around 7 and because heavy metals and ash have been removed from the exhaust gas prior to scrubbing it is possible to distribute spent scrubber solution into the environment with negligible risk thus fulfilling foreseen IMO regulations.

The thus cleaned exhaust gas is withdrawn from scrubber unit 8 and passed in pipe 36 to an exhaust stack (not shown).

FIG. 2 is an exploded view of an air pulse jet valve arrangement 20 connected to outlet of the particulate filters 18, shown in FIG. 1.

The air pulse jet valve arrangement 20 according to an embodiment of the invention comprises air blow pipes 21a and 21b with air nozzles (not shown) at outlet of the pipes. The air blow pipes are connected to a pressurized air supply from a compressed air tank (not shown) in pipe 23. Valve arrangement 20 comprises further an isolation valve 25 at outlet 18 of a filtration unit 4. Filtration unit 4 is provided with two filters 16a and 16b with outlet pipes 19a and 19b, respectively. The outlet pipes are in form of eductors.

Figure 2A:
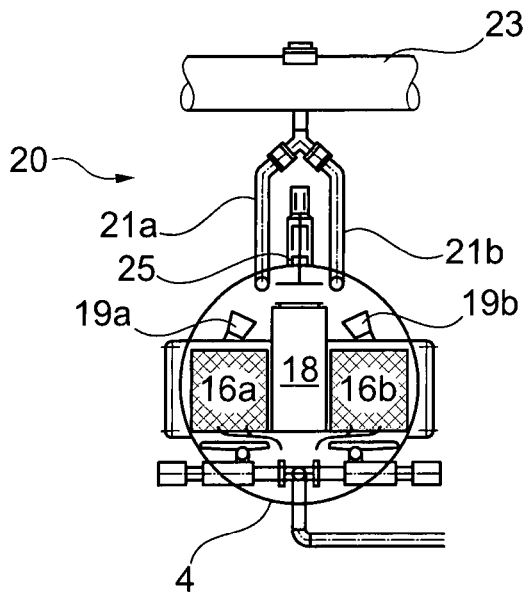

During filtration operation shown in FIG. 2a, outlet 18 is open and filtered exhaust gas leaving filters 16a and 16b from outlet pipes 19a and 19b is withdrawn through outlet 18.

Figure 2B:
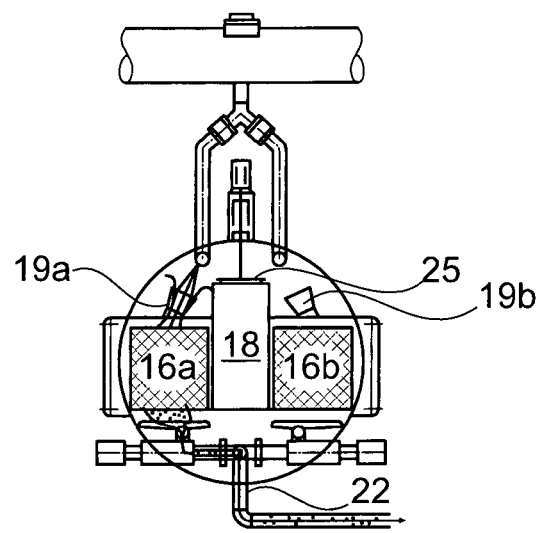
Figure 2C:
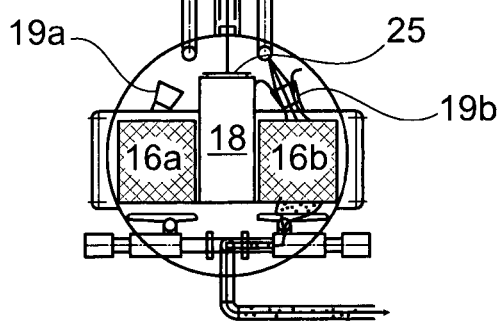

When the filters in unit 4 need to be regenerated, outlet 18 is locked by isolation valve 25 and pressurized air from pipe 23 is passed sequentially to air blow pipes 21a and 21b and pulse injected into eductors 19a and 19b, respectively, as shown in FIGS. 2b and 2c. The air pulses injected into filters 16a and 16b in reverse to the previous exhaust gas flow cause ash and remaining amounts of soot accumulated in the filters to loose from the filter surface and being blown off to a dust conveying system 22 at the outlet of filter unit 4.

After regeneration filter unit 4 is switched to filtration operation mode as shown in FIG. 2a.

The invention claimed is:

1. Method for removal of soot, hydrocarbons, ash and heavy metals being present in exhaust gas from an engine operated on heavy fuel oil with a sulphur content 0.1% to 4.0 wt % and a heavy metal element content of 5 mg/kg to 1000 mg/kg, comprising the steps of:
   operating the engine at a load to obtain an exhaust temperature of the exhaust gas of at least 325° C.;
   passing the exhaust gas at exhaust gas temperature 325° C. to 550° C. through the at least one filter unit each comprising at least one particulate filter and capturing the soot, ash and heavy metals contained in the exhaust gas, wherein the one or more filtration units are arranged in a pressure vessel upstream an engine turbocharger;
   continuously burning the captured soot and adhered hydrocarbons off the at least one particulate filter by contact with a catalyst being arranged on the filter;
   periodically disconnecting the at least one filter unit from flow of the exhaust gas unit and closing outlet of the at least one particulate filter;
   subsequently pulse injecting air into the closed outlet of the at least one particulate filter in reverse to the previous flow of the exhaust gas and blowing the captured ash together with the heavy metals off the at least one particulate filter.

2. The method of claim 1, wherein the at least one particulate filter is in form of a wall flow filter.

3. The method of claim 2, wherein the catalyst is coated on or inside the walls of the at least one particulate filter.

4. The method of claim 1, wherein the catalyst comprises of titanium dioxide, oxides of vanadium and tungsten and metallic palladium.

5. The method of claim 1, wherein body of the at least one particulate filter is prepared from silicon carbide, cordierite, mullite, aluminium titanate or sintered metal.

6. The method of claim 1, wherein the air is pulse injected with injection pulse duration of between 10 and 600 msec.

7. The method of claim 1, wherein the air for pulse injection is withdrawn from an accumulator tank with compressed air at a pressure of between 4 to 10 barg.

8. The method of claim 1, wherein the exhaust gas is passed through the at least one filter unit at a pressure of between 0 and 3 barg.

9. The method according to claim 1, comprising the further step of selective catalytic reduction of nitrogen oxides in the exhaust gas prior to the gas is passed through the at least one filter unit or after the gas has passed through the at least one filter unit.

10. The method according to claim 1, comprising the further step of reducing amounts of sulphur oxides contained in the exhaust gas by scrubbing the gas with an alkaline solution or sea water in an open or closed loop, downstream of the at least one filter unit.

11. System for removal of soot and ash being present in exhaust gas from an engine operated on heavy fuel oil, comprising:
   one or more exhaust gas inlet pipes connecting each the engine with inlet of each of one or more filtration units;
   one or more exhaust gas outlet pipes connected to outlet of each of the one or more filtration units, wherein the one or more filtration units are arranged in a pressure vessel upstream an engine turbocharger;
   at least one particulate filter catalyzed with a catalyst for effectuating burning off of soot with adhered hydrocarbons connected in parallel within the one or more filtration units, outlet of each of the at least one particulate filter is lockable; and an air pulse jet valve arrangement mounted at the outlet of the at least one particulate filter for blowing off ash from the at least one particulate filter, the air pulse jet valve arrangement comprises an isolation valve, one or more air blow pipes connected to an air supply, nozzles in the blow pipes and an eductor for pulse injection of air through the nozzles in the blow pipes into the at least one particulate filter.

12. The system of claim 11, wherein the at least one particulate filter is in form of a wall flow filter.

13. The system of claim 12, the at least one particulate filter is coated on walls or inside walls with a catalyst catalysing burning of captured soot of the filters.

14. The system of claim 11, wherein the catalyst consists of titanium dioxide, oxides of vanadium and tungsten and metallic palladium.

15. The system according to claim 11, wherein body of the at least one particulate filter is prepared from silicon carbide, cordierite, or mullite or aluminium titanate or sintered metal.

16. The system of claim 11, wherein the one or more air blow pipes are connected to an accumulator tank with compressed air.

17. The system of claim 11, wherein the one or more exhaust gas outlet pipes connect the one or more filtration units to a downstream selective catalytic reduction unit comprising a denitrification catalyst.

18. The system of claim 11, wherein the one or more exhaust gas inlet pipes connect the one or more filtration units to an upstream selective catalytic reduction unit comprising a denitrification catalyst.

19. The system of claim 11, wherein the one or more exhaust gas outlet pipes connect the one or more filtration units to a scrubber unit.

20. The system of claim 11, wherein a selective catalytic reduction unit comprising a denitrification catalyst unit is connected upstream to the one or more filtration units and downstream to a scrubbing unit.

21. The system of claim 17, wherein the selective catalytic reduction unit is arranged upstream or downstream an engine turbocharger.

22. The system of claim 11, further comprising a by-pass pipe by-passing the exhaust gas at least one of the one or more filtration units.

* * * * *